US010249888B2

(12) United States Patent
Lunt

(10) Patent No.: US 10,249,888 B2
(45) Date of Patent: Apr. 2, 2019

(54) PASSIVE RECIRCULATION DEVICE

(71) Applicant: Nuvera Fuel Cells, LLC, Billerica, MA (US)

(72) Inventor: Benjamin S. Lunt, Tewksbury, MA (US)

(73) Assignee: Nuvera Fuel Cells, LLC, Billerica, MA (US)

( * ) Notice: Subject to any disclaimer, the term of this patent is extended or adjusted under 35 U.S.C. 154(b) by 0 days.

(21) Appl. No.: 15/886,908

(22) Filed: Feb. 2, 2018

(65) Prior Publication Data

US 2018/0159152 A1 Jun. 7, 2018

Related U.S. Application Data

(62) Division of application No. 13/956,477, filed on Aug. 1, 2013, now Pat. No. 9,923,215.

(Continued)

(51) Int. Cl.
*H01M 8/04089* (2016.01)
*F16K 1/12* (2006.01)
*F16K 31/122* (2006.01)

(52) U.S. Cl.
CPC ......... *H01M 8/04097* (2013.01); *F16K 1/123* (2013.01); *F16K 31/1223* (2013.01)

(58) Field of Classification Search
CPC ................................................ H01M 8/04097
See application file for complete search history.

(56) References Cited

U.S. PATENT DOCUMENTS 6,434,943 B1 * 8/2002 Garris ............... H01M 8/04089
417/178
2002/0106547 A1 8/2002 Sugawara et al.
(Continued)

FOREIGN PATENT DOCUMENTS

CN 1954454 A 4/2007
EP 2242138 A1 10/2010
(Continued)

OTHER PUBLICATIONS

Communication Pursuant to Rule 164(2)(b) and Article 94(3) EPC issued in European Patent Application No. 13 750 774.2-1373 dated Aug. 2, 2017, 5 pages.

(Continued)

*Primary Examiner* — Sarah A. Slifka
*Assistant Examiner* — Brian R Ohara
(74) *Attorney, Agent, or Firm* — Finnegan, Henderson, Farabow, Garrett & Dunner LLP

(57) ABSTRACT

The present disclosure provides a recirculation device comprising a body comprising at least one first passage configured to receive an exhaust, at least one second passage configured to receive a fuel, at least one third passage configured to receive a mixture of the exhaust and the fuel, and a longitudinal axis extending from the second passage to the third passage. The device can also comprise a nozzle comprising an inner cavity for directing fuel towards an orifice, located at the smallest cross-sectional area of the inner cavity and a piston slideably located within the body comprising a first end configured to receive the fuel and a second end configured to fuel to the nozzle cavity, whereby the piston can be actuated along the longitudinal axis of the body by the exhaust controlling the flow of fuel passing through the orifice. A mixing chamber located within the (Continued)

body can be configured to receive an exhaust and configured to receive fuel from the orifice.

7 Claims, 5 Drawing Sheets

Related U.S. Application Data

(60) Provisional application No. 61/680,845, filed on Aug. 8, 2012.

(56) References Cited

U.S. PATENT DOCUMENTS

| | | | |
|---|---|---|---|
| 2003/0096145 A1 | 5/2003 | Sugawara et al. | |
| 2005/0002797 A1 | 1/2005 | Morishima | |
| 2005/0244682 A1 | 11/2005 | Meacham | |
| 2008/0199746 A1 | 8/2008 | Kobayashi et al. | |
| 2009/0155092 A1 | 6/2009 | Fukuma | |
| 2010/0009223 A1 | 1/2010 | Blanchet et al. | |
| 2010/0068579 A1* | 3/2010 | Ainscough | H01M 8/04097 429/411 |
| 2010/0209818 A1* | 8/2010 | Fukuma | H01M 8/04097 429/513 |
| 2012/0189927 A1 | 7/2012 | Kato et al. | |

FOREIGN PATENT DOCUMENTS

| | | |
|---|---|---|
| JP | 2005-248712 A | 9/2005 |
| JP | 2006-164562 A | 6/2006 |
| JP | 2006-310000 A | 11/2006 |
| JP | 2007-18831 A | 1/2007 |
| JP | 2007-506257 A | 3/2007 |
| JP | 2009-238596 A | 10/2009 |
| JP | 2010-272439 A | 12/2010 |
| SU | 1081369 A | 3/1984 |

OTHER PUBLICATIONS

Communication Relating to the Results of the Partial International Search in International Application No. PCT/US2013/053278 dated Oct. 18, 2013.
First Office Action issued in Chinese Patent Application No. 201380052404.9, dated Jul. 6, 2016.
International Preliminary Report on Patentability issued for PCT/US2013/053278, dated Feb. 10, 2015.
Notice of Reasons for Rejection issued in Japanese Patent Application No. 2015-526586, dated May 18, 2017, 2 pages.
Second Office Action issued in Chinese Patent Application No. 201380052404.9, dated Mar. 2, 2017.

* cited by examiner

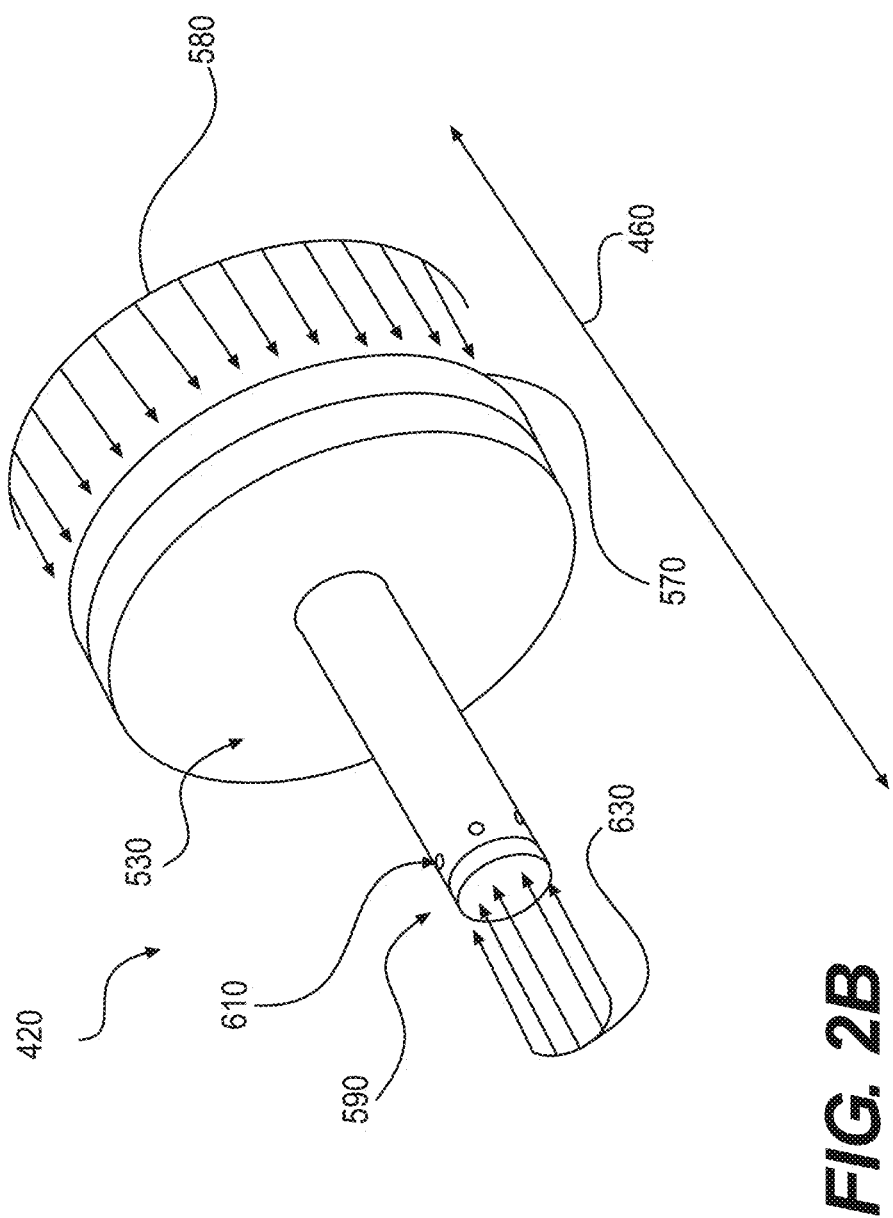

PASSIVE RECIRCULATION DEVICE

RELATED APPLICATIONS

This application is a divisional of U.S. application Ser. No. 13/956,477, filed Aug. 1, 2013, which claims the benefit of U.S. Provisional Application No. 61/680,845, filed Aug. 8, 2012, the entire contents of which are incorporated herein by reference.

TECHNICAL FIELD

The present disclosure relates to a recirculation device for passively controlling fluid flow. In some embodiments, the recirculation device described herein can be used to control an amount of fuel supplied to a recirculation loop of a fuel cell.

BACKGROUND

Various devices, such as valves or ejectors, are used to control fluid flow in liquid and gas form. Such devices are often incorporated into a mechanical assembly in order to control the flow of a fluid within the assembly or flows of fluid into or out of the assembly. To increase or decrease such fluid flow, valves or ejectors can have integrated electrical, pneumatic, or mechanical control components. While these active control mechanisms are commonly used, passive control based on the fluid pressure is less common because of difficulties accurately controlling fluid flow or sizing components to ensure effective operation over a wide range of conditions.

A fuel cell is a device for generating electric power. The chemical energy from a fuel is converted into electricity through a chemical reaction with oxygen or other oxidizing agent. The chemical reaction typically yields electricity, heat, and water. In operation, fuel cells usually require controlled flows of fuel, oxidizing agent, or cooling fluid.

A fuel cell can include an anode in an anode compartment, a cathode in a cathode compartment, and an electrolyte that allows charges to move between the anode and cathode. Electrons are drawn from the anode to the cathode through an electric load circuit, producing electricity. To vary electrical output, valves, ejectors, or other flow devices can be configured to control fluid flows to one or more compartments.

In some examples, a flow of fuel is supplied to an anode compartment, and a flow of oxygen containing gas (e.g., air) is fed to a cathode compartment. The fuel can flow continuously through the anode compartment while a portion of the fuel undergoes an electrochemical reaction in the anode compartment, as represented by the equation below.

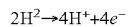

Electrons produced by the anode electrochemical reaction are drawn from the anode to the cathode through an electric load circuit, producing direct-current electricity. The positively charged ions produced by the reaction are drawn from the anode through the electrolyte to the cathode. An electrolyte can be configured to prevent the passage of negatively charged electrons while allowing the passage of positively charged ions.

Following passage of the positively charged ions through the electrolyte, the ions can combine in the cathode compartment with electrons that have passed through the electric load circuit. The combination can form a cathode electrochemical reaction in which water is produced from the reduction of oxygen, as represented by the equation below.

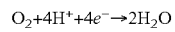

The amount of fuel oxidized in the anode compartment can be dependent on the amount of power required from the electric load circuit. Not all fuel supplied to the anode compartment is oxidized as a portion of the fuel is discharged from the anode compartment.

To increase the overall efficiency of the fuel cell, the outlet from the anode compartment can flow back to the inlet of the anode compartment by way of a recirculation loop. To enable the fuel cell to continuously output power, fuel must be introduced into the recirculation loop to replace the fuel that was oxidized in the anode compartment. The rate at which fuel is introduced into the recirculation loop will depend on the load being applied to the electrical circuit; the greater the load, the more fuel is required.

A flow of fuel introduced into the recirculation loop can be controlled by a variety of devices, including valves or ejectors. Supplying an appropriate amount of fuel to the recirculation loop when a fuel cell ramps up from minimum to maximum power output, and vice versa, may require multiple ejectors of varying sizes or a control valve capable of throttling the flow. Multiple ejectors with different size nozzles, as well as control valves, can be costly and can increase a device's complexity.

Some prior art devices have reduced the need for multiple ejectors by using variable flow ejectors, while others have used a control valve in combination with an ejector. For example, U.S. Pat. No. 6,858,340 discloses a variable flow ejector for use in a fuel cell system. Two diaphragms within the ejector control needle movement relative to the nozzle to regulate fluid flow through the ejector. U.S. Pat. No. 7,536,864 and U.S. Pat. No. 6,779,360 use an actuator to control the nozzle opening. And U.S. Patent Application No. 2010/0068579 discloses a control valve used in conjunction with an ejector.

However, none of these valves and ejectors operate with passive control because they all require some form of active control system. For example, multiple fluids are used to deform multiple diaphragms, a managed actuator maneuvers a ram, a control actuator positions a needle, or a control valve throttles the flow based on downstream feedback. The present disclosure overcomes at least some deficiencies of the prior art.

In consideration of the aforementioned circumstances, the present disclosure provides a recirculation device that can be integrated into a fuel cell system. The recirculation device can passively control anode recirculation flow based on anode compartment exhaust pressure. The device may supply fuel to the fuel cell to permit operate over a range of conditions from a minimum to a maximum power output.

SUMMARY

One aspect of the present disclosure is directed to a recirculation device that can comprise a body comprising at least one first passage configured to receive an exhaust, at least one second passage configured to receive a fuel, at least one third passage configured to receive a mixture of the exhaust and the fuel, and a longitudinal axis extending from the second passage to the third passage. The device can also comprise a nozzle comprising an inner cavity for directing fuel towards an orifice, located at the smallest cross-sectional area of the inner cavity and a piston slideably located within the body comprising a first end configured to receive the fuel and a second end configured to fuel to the nozzle cavity, whereby the piston can be actuated along the longitudinal axis of the body by the exhaust controlling the flow of fuel passing through the orifice. A mixing chamber located within the body can be configured to receive an exhaust and configured to receive fuel from the orifice.

Another aspect of the present disclosure is directed to a recirculation device, comprising a body comprising at least one first passage configured to receive an exhaust, at least one second passage comprises a valve seat configured to receive a fuel, at least one third passage configured to receive a mixture of the exhaust and the fuel, and a longitudinal axis extending from the second passage to the third passage. A nozzle comprising an inner cavity can direct fuel towards a orifice, located at the smallest cross-sectional area of the inner cavity, wherein nozzle can be fixedly coupled to body. The recirculation device can also comprise a piston slideably located within the body comprising a first end configured to receive the fuel and a second end configured to fuel to the nozzle cavity, the piston surface can be configured to receive exhaust whereby the piston can be actuated along the longitudinal axis of the body by the exhaust controlling the flow of fuel passing through the orifice. A mixing chamber can be located within the body configured to receive an exhaust and configured to receive fuel from the orifice and a valve stem comprising a tapered end can be fixedly coupled to the first end of the piston, whereby the actuated piston along the longitudinal axis controls the distance between the valve stem first end and valve seat.

Another aspect of the present disclosure is directed to recirculation device, comprising a body comprising at least one first passage configured to receive an exhaust, at least one second passage configured to receive a fuel, at least one third passage configured to receive a mixture of the exhaust and the fuel, and a longitudinal axis extending from the second passage to the third passage. The device can also comprise a nozzle comprising an inner cavity for directing fuel towards an orifice, located at the smallest cross-sectional area of the nozzle cavity, whereby nozzle can be fixedly coupled to the second end of the piston. The device can also comprise a piston slideably located within the body comprising a central cavity configured to receive a first needle section through the full length of the piston central cavity, piston surface can be configured to receive exhaust, whereby the piston can be actuated along the longitudinal axis of the body by the exhaust pressure controlling the flow of fuel passing through the orifice. A mixing chamber can be located within the body configured to receive an exhaust and configured to receive fuel from the orifice. The device can also comprise a needle fixedly coupled to the body comprising a first section comprising a passage for receiving the fuel which feeds into a central cavity that connects to a second needle section whereby the first needle section and second needle section are fixedly coupled. The needle can also comprise a second section having an outlet passage allowing fuel to exit from the central cavity into the nozzle cavity; second needle section tapers toward the second end whereby the surface of the tapered needle section is parallel to the tapered inner surface of the nozzle and configured to engage the inner surface of the nozzle as the nozzle and piston actuate.

It is to be understood that both the foregoing general description and the following detailed description are exemplary and explanatory only and are not restrictive of the disclosure, as claimed.

BRIEF DESCRIPTION OF THE DRAWINGS

The accompanying drawings, which are incorporated in and constitute a part of this specification, illustrate several embodiments of the present disclosure and together with the description, serve to explain the principles of the disclosure.

FIG. 2B is a schematic isometric view of a piston and valve stem, according to an exemplary embodiment.

DESCRIPTION OF THE EMBODIMENTS

Reference will now be made in detail to the present exemplary embodiments of the disclosure, examples of which are illustrated in the accompanying drawings. Wherever possible, the same reference numbers will be used throughout the drawings to refer to the same or like parts.

Figure 1:
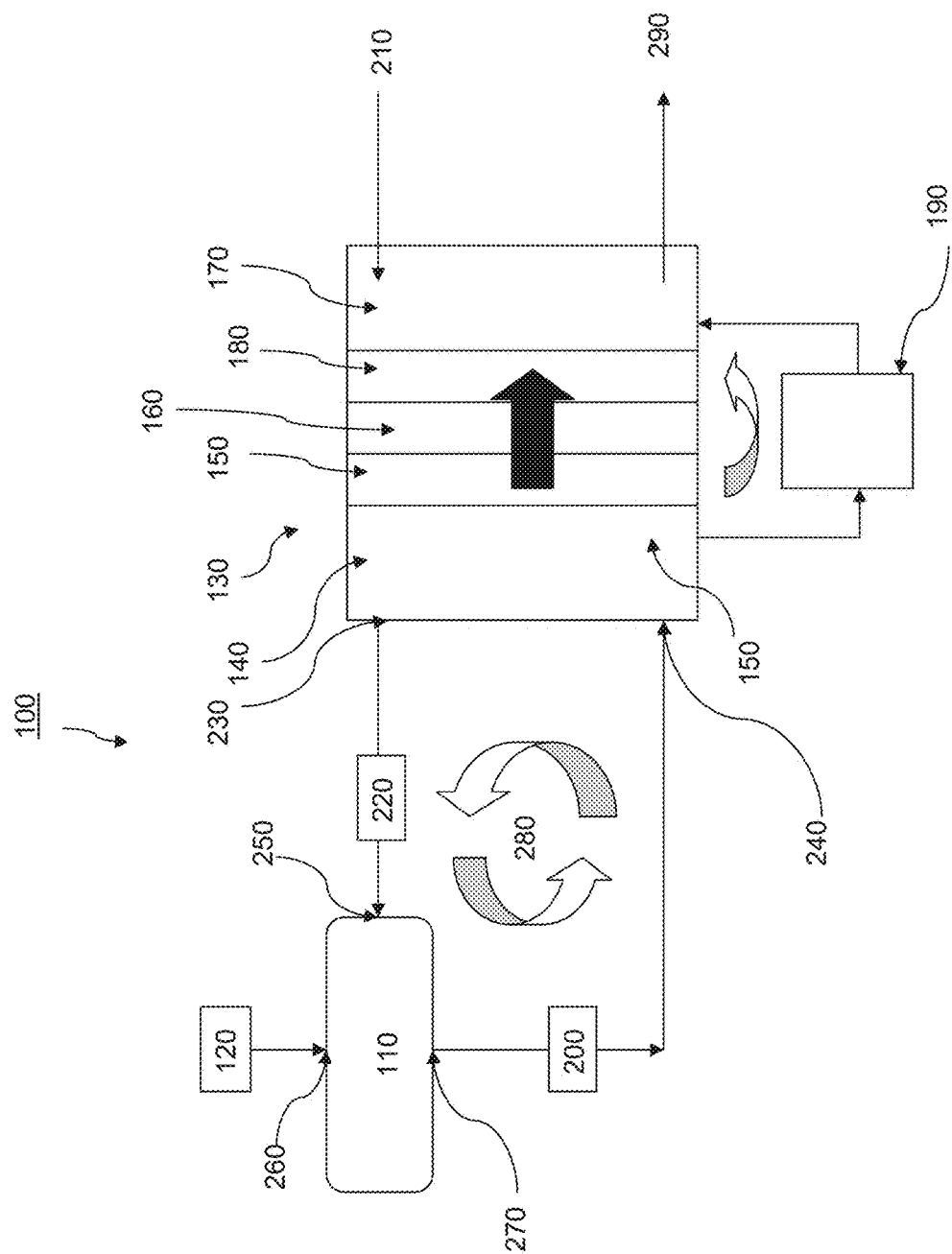
FIG. 1 is a schematic diagram of a fuel cell system, according to an exemplary embodiment.

FIG. 1. is a schematic diagram of a fuel cell system 100, according to an exemplary embodiment. Fuel cell system 100 can comprise a recirculation device 110. For example, recirculation device 110 can comprise a passive recirculation ejector as described below in detail. In addition to recirculation device 110, fuel cell system 100 can comprise a fuel 120 and a fuel cell 120. Fuel 120 can comprise hydrogen, carbon monoxide, methanol, and dilute light hydrocarbons like methane. As explained above, fuel cell 130 can be configured to generate electricity via a chemical reaction.

As shown in FIG. 1, fuel cell 120 can comprise an anode compartment 140, an anode 150, an electrolyte 160, a cathode compartment 170, a cathode 180, and an electric load circuit 190. Electrolyte 160 can comprise a polymer membrane and an aqueous alkaline solution. In some embodiments, fuel cell 120 can comprise a proton exchange membrane, phosphoric acid, solid oxide, or molten carbonate.

A continuous flow of a mixed fuel 200 can be supplied to anode compartment 140. A flow of oxygen 210 can be supplied to cathode compartment 170. Once mixed fuel 210 enters anode compartment 140, a portion of the mixed fuel 200 may undergo an anode electrochemical reaction at anode 150.

Not all mixed fuel 200 supplied to anode compartment 140 is necessarily consumed in an anode electrochemical reaction. A portion of mixed fuel 200 that flows into anode compartment 140 may be discharged from anode compartment 140 as an exhaust 220 through an anode compartment outlet 230. Exhaust 220 discharged from anode compartment outlet 230 can exit at a lower pressure than mixed fuel 200 entering anode compartment inlet 240 due to the fixed volume pressure reduction from the fuel consumed in the anode electrochemical reaction.

Anode compartment outlet 230 may be fluidly connected to a first passage 250 of recirculation device 110. Exhaust 220 can enter recirculation device 110 via first passage 250 and can be mixed with a flow of fuel 120. Fuel 120 can be supplied through a second passage 260 of recirculation device 110. After exhaust 220 and fuel 120 are mixed in recirculation device 110, the mixture can be discharged through a third passage 270 as mixed fuel 200. Third passage 270 may be fluidly connected to anode compartment inlet 240, allowing mixed fuel 200 to flow into anode compartment 140. A flow of a recirculation loop 160 can flow between recirculation device 110 and fuel cell 130 as illustrated in FIG. 1.

Under typical operating conditions a pressure of fuel 120 at second passage 260 can range between about 30 to about 500 psig. A pressure of exhaust 220 in first passage 250 can range between about three to about 60 psig. And a pressure of mixed fuel 200 exiting third passage 270 can range between about three to about 20 psig. The reasons for these variable pressure ranges are described below.

The anode electrochemical reaction taking place in anode compartment 140 consumes mixed fuel 200 and reduces the fixed volume pressure within the recirculation loop 160. To counter this, recirculation device 110 may be operated with continuous fuel recirculation. Specifically, fuel 120 introduced into second passage 260 at a particular flow rate may maintain the fixed volume pressure within the recirculation loop 160 required to maintain power production from fuel cell 130 while electric load circuit 190 ramps up or down in power output. Recirculation device 110 can be configured to regulate flow of fuel 120 as described above, i.e., passively and without active control.

Figure 2A:
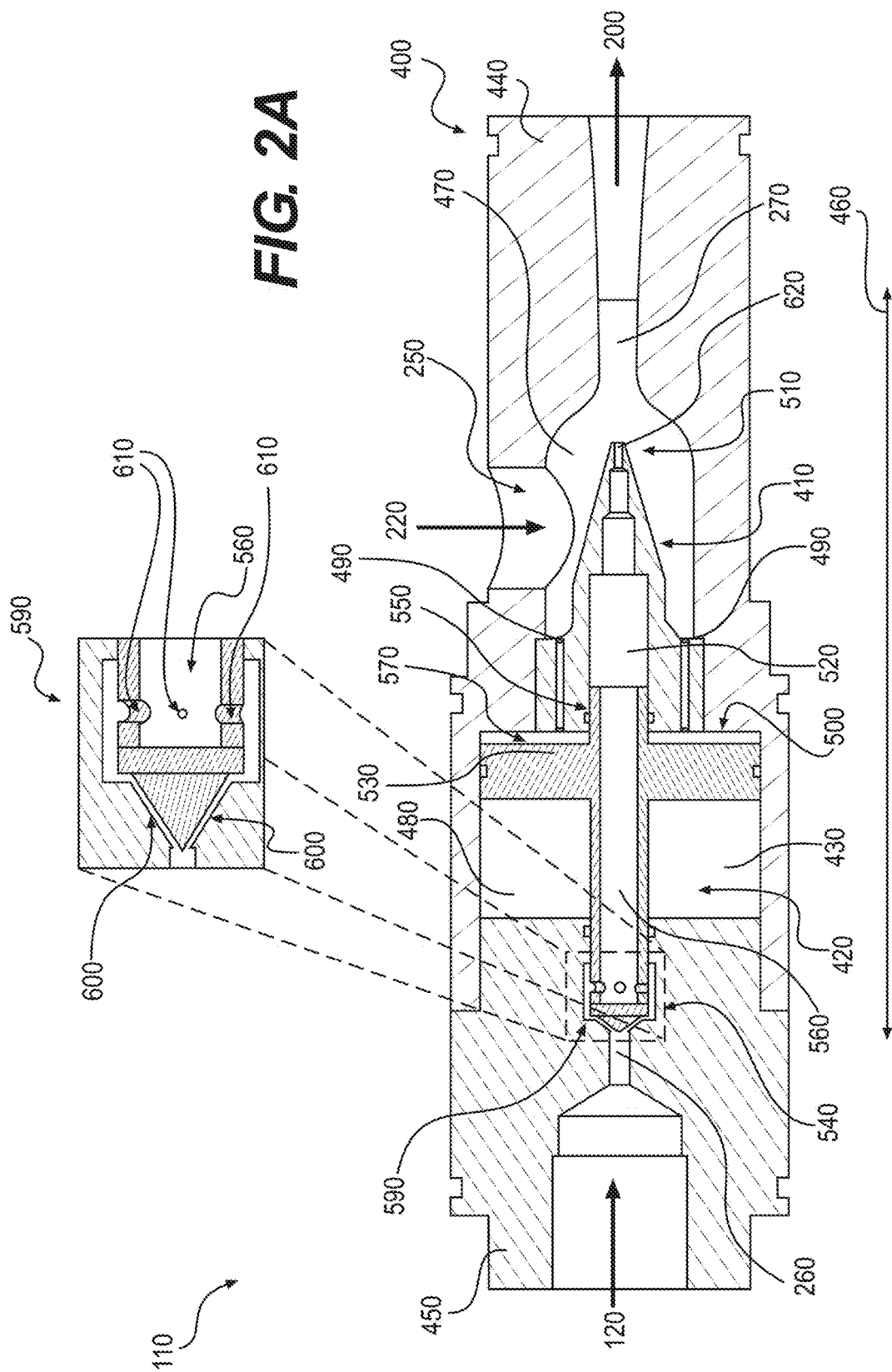
FIG. 2A is a cut-away cross-sectional view of an ejector, according to an exemplary embodiment including an enlarged section of the ejector.

FIG. 2A. is a cross-sectional diagram of recirculation device 110, according to an exemplary embodiment. Recirculation device 110 may comprise a body 400, a nozzle 410, and a piston 420. As previously described, recirculation device 110 can be configured to receive exhaust 220 via first passage 250 and fuel 120 via second passage 260. Flows of fuel 120 and exhaust 220 can combine and mixed fuel 200 can exit recirculation device 110 via third passage 270.

Body 400 can comprise a structure with an internal cavity 430 configured to house nozzle 410 and piston 420. For example, body 400 may be constructed of a metal, metal alloy, plastic, composite material, or equivalent material. Body 400 can have a coating or undergo surface treatments to reduce friction or increase corrosion protection. For example, a teflon coating or hard anodize treatment can be utilized.

Body 400 can comprise a single structure or an assembly of multiple pieces. In particular, recirculation device 110 can be designed for easy removal from the fuel cell system 100 to allow for servicing or replacement. For example, body 400 can comprise a first body section 440 and a second body section 450. Body sections 440 and 450 may be fixedly or removably coupled to each other using various attachment mechanisms.

Recirculation device 110 can include a longitudinal axis 460 extending from an upstream section of body 400 to a downstream section of body 400. For example, first body section 440 can be downstream (i.e., the right side in FIG. 2A) and second body section 450 can be placed upstream (i.e., the left side in FIG. 2A). Fuel 120 can flow generally parallel to longitudinal axis 460 from upstream to downstream. Exhaust 220 can flow generally perpendicular to longitudinal axis 460 and fuel 120, and can be mixed with fuel 120 to form mixed fuel 200 that may also flow generally parallel to longitudinal axis 460 from third passage 270.

Third passage 270 can extend through at least part of body 400 or first body section 440. For example, third passage 270 can extend from an inner surface of internal cavity 430 to an exterior surface of first body section 440. Third passage 270 can include a tapered section and may be configured to enhance mixing of fuel 120 and exhaust 220.

First passage 250 can be configured to receive exhaust 220. Although first passage 250 is shown as perpendicular to third passage 270 in FIG. 2A, first passage 250 can be oriented at various angles relative to third passage 270. First passage 250 may extend through at least part of body 400 or first body section 440. In particular, first passage 250 may extend from an outer surface of body 400/first body section 440 to an inner surface of internal cavity 430. Other embodiments, first passage 250 may comprise multiple passages configured to receive exhaust 220.

Second passage 260 can be configured to receive a flow of fuel 120. In some aspects, second passage 260 can extend from an exterior surface of body 400 or second body section 450 to an inner surface of internal cavity 430. Second passage 260 can include various couplings (not shown) configured to couple to a fuel 130 supply line.

Connection fittings (not shown) at first passage 250, second passage 260, third passage 270, anode compartment inlet 240, or anode compartment outlet 230 may utilize a quick-connect coupling or equivalent style connections to allow for easy assembly or disassembly. The connection fittings may be configured to absorb vibration or pressure fluctuations that can be caused by discharged of flow from the nozzle 410.

In an alternate embodiment (not shown), the geometry of recirculation device 110 may be integrated into a portion of fuel cell 130. Such a configuration may eliminate the need for interconnecting fittings.

Body 400 can be configured to receive nozzle 410. Nozzle 410 can be configured to introduce a flow of fuel 120 into a mixing chamber 470 where fuel 120 is combined with exhaust 220. Mixed fuel 200 is subsequently output from recirculation device 110 and forms part of recirculation loop 280.

Nozzle 410 can be configured to accelerate a flow of fuel 120 as it flows from an upstream location (to the left as shown in FIG. 2A) to a downstream location (to the right as shown in FIG. 2A). Nozzle 410 can be shaped or sized to aerosolize fuel 120 to permit sufficient mixing of fuel 120 with exhaust 220 in mixing chamber 470. Nozzle 410 can be configured so the flow rate of fuel discharged from nozzle 410 creates a relative negative pressure in the mixing chamber 470 region lateral to the nozzle.

In some embodiments, nozzle 410 can be configured to operate with supersonic fluid flow. Nozzle 410 may also be configured to receive a flow of exhaust 220 generally perpendicular to a flow of fuel 120 exiting nozzle 410. An outer surface of nozzle 410 may be configured to form a substantially turbulent flow of exhaust 220 about the flow of fuel 120 exiting nozzle 410. In particular, a flow of exhaust 220 may swirl around nozzle 410 in a generally circular motion about a jet of fuel 120 exiting nozzle 410. Such different flow paths of fuel 120 and exhaust 220 may enhance mixing of the two flows of fluids.

Nozzle 410 may be constructed of a metal, metal alloy, composite material or equivalent material able to handle high pressure and high velocity fluid applications without eroding. The inner surface of nozzle 410 can have a polished low friction finish to maximum flow-rate efficiency or maintain high discharge velocity of fuel 120.

In other embodiments, nozzle 410 can be formed as part of the body 400, creating a single structure of body 400 and nozzle 410. And in yet other embodiments, nozzle 410 can be formed as part of first body section 440 or second body section 450.

Nozzle 410 can divide internal cavity 430 into a mixing chamber 470 downstream of nozzle 410 and a piston chamber 480 upstream of nozzle 410. Mixing chamber 470 and piston chamber 480 may be fluidly connected. For example, exhaust 220 could flow from first passage 250 or mixing chamber 470 to piston chamber 480. For example, one or more through ports 490 can be configured to permit fluid flow into piston chamber 480 from mixing chamber 470.

In other embodiments, the flow of exhaust 220 into piston chamber 480 can be by way of a passage in the body 400 structure which fluidly connects the mixing chamber 470 to the piston chamber 480.

Nozzle 410 can have a first end 500 located generally upstream and a second end 510 located generally downstream. Nozzle 410 can comprise a nozzle cavity 520 located between first end 500 and second end 510, wherein nozzle cavity 520 may be configured to provide passage of fuel 120 through nozzle 410. As shown in FIG. 2A, nozzle cavity 520 can decrease in diameter, narrowing while extending from first end 500 to second end 510.

Second end 510 can comprise an orifice 620 configured to permit a flow of fuel 120 to pass from nozzle cavity 520 to mixing chamber 470. Orifice 620 can be shaped to provide spray or flow distribution of fuel 120 into mixing chamber 470. Orifice 620 could be located at an end-most surface of second end 510 or located generally within a downstream region of second end 510. It is also contemplated that orifice 620 opening may comprise a cross-sectional shape of a square, rectangle, circle, triangle, or other shape.

First end 500 of nozzle 410 can be configured to receive fuel 120 into nozzle cavity 520. In particular, first end 500 can receive at least part of piston 420. In other embodiments, nozzle 410 may not receive piston 420. Rather piston 420 may be received by a portion of body 400 which fluidly connects to nozzle cavity 520.

Piston 420 can be configured to provide passage of fuel 120 from second passage 260 to first end 500 of nozzle 410. Piston 420 can also be configured to control flow of fuel 120 passing through second passage 260 to first end 500 of nozzle 410 and out of orifice 620. In some embodiments piston 420 can control flow of fuel 120 based on a pressure of exhaust 220 formed in piston chamber 480.

Piston 420 may be constructed of a metal, metal alloy, composite material or equivalent material able to handle high pressure and high velocity fluid applications.

Piston 420 may be slideably located in piston chamber 480 formed within first body section 440. In other embodiments, piston 420 may be slideably located in piston chamber 480 formed within second body section 450 or single body 400 comprising a single structure.

Piston 420 may slide along piston chamber 480 inner surface by way of a bearing or equivalent mechanism while still maintaining a sealed edge. The outer edge of piston 420 can be configured to seal tight against the piston chamber 480 inner surface in order to prevent exhaust 220 from bypassing piston 420.

In an alternate embodiment, a diaphragm (not shown) can be used to allow sliding of piston 420 in relation to piston chamber 480. A diaphragm seal (not shown) may be fixed to the outer wall of piston 420 and inner wall of piston chamber 480.

Adequate friction between piston 420 and piston chamber 480 surface may be present to prevent rapid oscillation of the piston 420 in response to exhaust 220 pressure fluctuations. Piston chamber 480 can be generally cylindrical configured to receive piston 420. In other embodiments, piston chamber 480 may be a different shape. For example, piston chamber 480 maybe a square, oval, or rectangle configured to receive a piston 420 having a corresponding shape.

Piston 420 can have a first end 540 being the upstream end and a second end 550 being the downstream end. Piston 420 can have a piston cavity 560 located between first end 540 and second end 550 providing fluid passage from a region about first end 540 to second end 550. Second end 550 can fluidly connect with nozzle cavity 520.

Piston 420 can comprise a piston head 530. Piston head 530 can extend laterally from a wall surrounding piston cavity 560 toward piston chamber 480 inner surface. Piston head 530 can generally move along longitudinal axis 460 in piston chamber 480. Piston head 530 can be configured to a flow of exhaust 220 at a piston head surface 570. In particular, a pressure of exhaust 220 can be exerted against piston head surface 570 to move piston 420 longitudinally.

First end 540 of piston 420 can comprise a valve stem 590. Valve stem 590 can have a tapered end configured to mate with a valve seat 600. An inlet passage 610 can be located in the general region of first end 540. Inlet passage 610 can allow fuel 120 that flows from second passage 260 and passes between valve seat 600 and valve stem 590 to flow into piston cavity 560.

As discussed above, recirculation device 110 can be configured to receive fuel 120 through second passage 260 and combine fuel 120 with exhaust 220. Second passage 260 formed in second body section 450 can taper down to a narrow cross-sectional area before the walls may expand out increasing the cross-sectional area of the second passage 260 forming valve seat 600. Valve seat 600 can be configured to engage valve stem 590.

The outer-peripheral face of valve stem 590 can be shaped such that in the vicinity of the first end 540, its diameter decreases moving towards the outer most surface of first end 540. Valve stem 590 may end in a point. Downstream from first end 540 can be inlet passage 610 that extends from the outer surface of the valve stem 590 through the wall of valve stem 590 to piston cavity 560. Inlet passage 610 can allow fuel 120 from second passage 260 that passes between valve seat 600 and valve stem 590 to flow into piston cavity 560. Fuel 120 can flow from piston cavity 560 to second end 550 and into nozzle cavity 520. From nozzle cavity 520, fuel 120 can flow through orifice 620 into mixing chamber 470. As a result of the fuel 120 flow path described above, fuel 120 that passes between valve seat 600 and valve stem 590 can flow until it reaches the mixing chamber 470 where it may mix with exhaust 220 forming mixed fuel 200.

Recirculation device 110 can operate as follows. Exhaust 220 can exert a pressure against piston head surface 570 creating a force 580 as shown in FIG. 2B. The direction upstream of force 580 can be generally parallel to longitudinal axis 460.

Force 580 may cause piston 420 and valve stem 590 to slide toward second passage 260 and valve seat 600 upstream, generally along longitudinal axis 460. For example, the piston 420 and valve stem 590 may slide upstream until valve stem 590 contacts valve seat 600 and the surfaces engage. This engagement may completely block all flow through second passage 260. Accordingly, the area of the opening between valve stem 590 and valve seat 600 can be changed by actuating piston 420 and valve stem 590 along longitudinal axis 460. Movement of piston 420 relative to body 400 can control the flow rate of fuel 120 flowing through second passage 260 and between valve seat 600 and valve stem 590.

Fuel 120 passing between valve stem 590 and valve seat 600 may flow through inlet passage 610 into piston cavity 560 to nozzle cavity 520. From nozzle cavity 520, fuel may flow out through orifice 620 into mixing chamber 470. In mixing chamber 470, fuel 120 may mix with exhaust 220.

Ultimately, fuel 120 can flow out third passage 270 as mixed fuel 200 to anode compartment 140.

Fuel 120 entering second passage 260 can contact the tapered end of valve stem 590 as it passes through valve seat 600. As such, fuel 120 can exert a pressure against the tapered surface of valve stem 590, creating a fuel force 630 as shown in FIG. 2B. Force 630 can be generally in a downstream direction along longitudinal axis 460. The sum of force 580 and fuel force 630 may determine the position of piston 420 and valve stem 590 in relation to body 400. Balancing forces 580, 630 an control the flow rate of fuel 120 that flows through nozzle 410 and orifice 620 and into the mixing chamber 470.

FIG. 2B is a schematic isometric view of piston 420, according to an exemplary embodiment. FIG. 2B shows the available surface area of the piston head 530 and valve stem 590 along with force 580 and a fuel force 630 that can be applied to piston 420 and valve stem 590.

In other embodiments, fuel force 630 may be supplemented by a spring (not shown). Such a spring could be placed within piston chamber 480. For example, the spring could be configured to exert additional force against piston 420 in a downstream direction. This direction could be generally parallel to the longitudinal axis 460. Selecting the spring can set the desired anode pressure that is required to actuate the piston. In an alternate embodiment, spring (not shown) under force of tension may be used to supplement force 580.

Figure 3A:
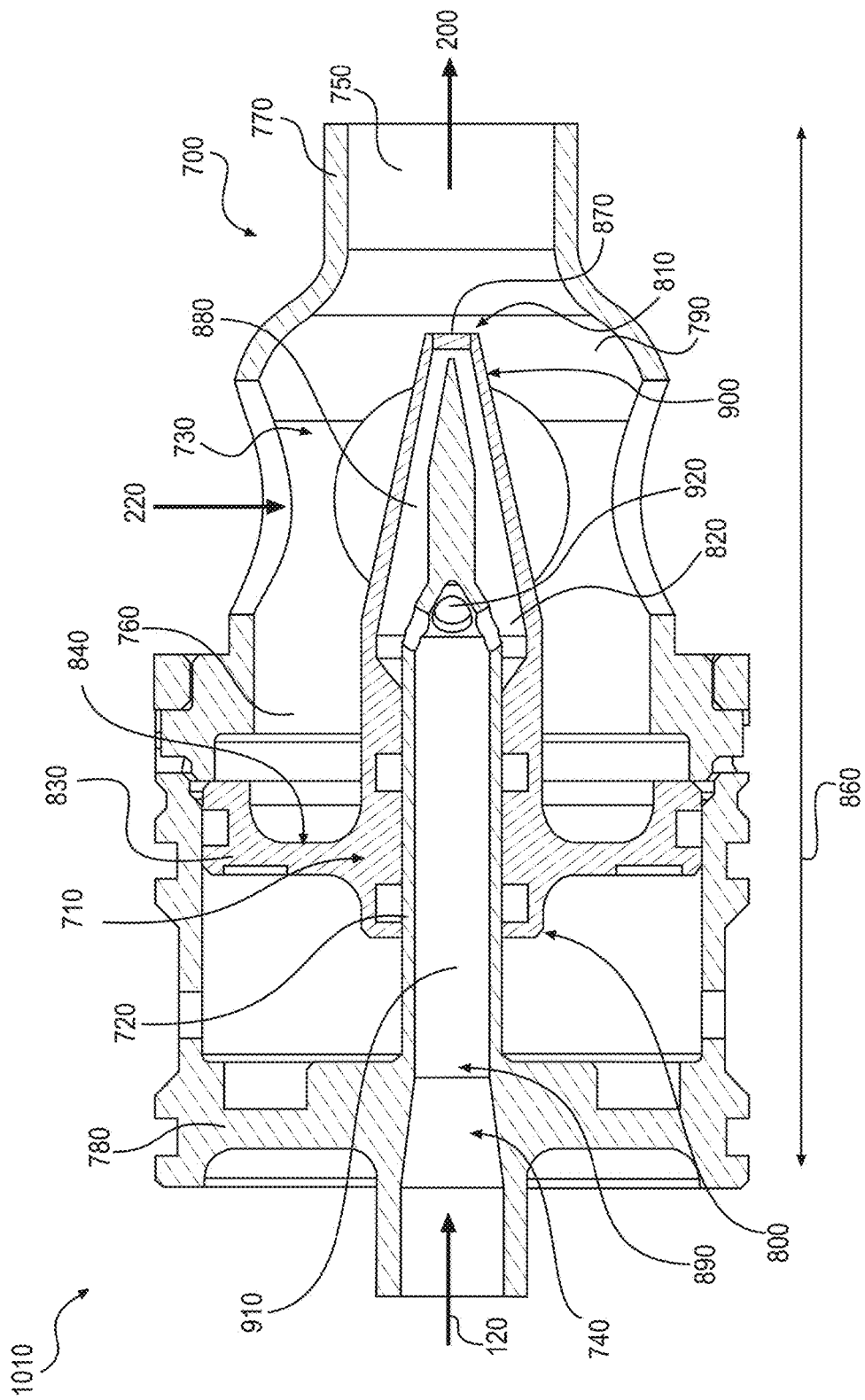
FIG. 3A is a cut-away cross-sectional view of an ejector, according to another exemplary embodiment.

FIG. 3 shows an alternate embodiment of recirculation device 1010. As in FIG. 2, recirculation device 1010 may comprise a body 700 and a piston 710. However, the embodiment disclosed in FIG. 3 can also have a needle 720.

Similar to body 400 in FIG. 2, body 700 can receive a flow of exhaust 220 in first passage 730 and fuel 120 in second passage 740. Both flows may mix within body 700 and be discharged as mixed fuel 200 from third passage 750 as shown in FIG. 1.

Body 700 can comprise a structure with an internal cavity 760 configured to house piston 710. For example, body 700 can comprise a first body section 770 and a second body section 780. Body sections 770, 780 may be coupled to each other using various mechanisms as described above.

Piston 710 can be configured to introduce a flow of fuel 120 into mixing chamber 790 similar to nozzle 410 described above. For example, piston 710 can accelerate fuel 120 as it flows through piston 710. Fuel 120 can reach velocity necessary to entrain exhaust 220 with fuel 120 to permit mixing within mixing chamber 790. Piston 710 can provide passage of fuel 120 from needle 720 to mixing chamber 790. Piston 710 can also control flow of fuel 120 through second passage 740 based on exhaust 220 pressure in internal cavity 760 applied against piston 710.

Piston 710 may be slideably located in internal cavity 760 formed in body 700. Piston 710 may slide along internal cavity 760 by way of a bearing or equivalent mechanism while still maintaining a sealed edge. Body 700 can be configured to limit the range piston 710 may slide in internal cavity 760. Adequate friction between piston 710 and internal cavity 760 surface may be present to prevent rapid oscillation of the piston 710 in response to pressure fluctuations of exhaust 220.

Piston 710 can have a first end 800 located generally upstream and a second end 810 located generally downstream. Piston 710 can comprise a piston cavity 820 located between first end 800 and second end 810, wherein piston cavity 820 may be configured to receive needle 720 and provide passage of fuel 130 through piston 710.

First end 800 can comprise a piston head 830 configured to receive needle 720. Piston head 830 can be configured to receive exhaust 220 pressure at piston head surface 840. Exhaust 220 can exert a pressure against the piston head surface 840 creating a force 850 in a generally upstream direction.

The outer edge of piston head 830 can be configured to seal tight against the inner cavity 760 surface in order to prevent exhaust 220 from bypassing the piston head surface 830.

Second end 810 of piston 710 can comprise orifice 870 to allow fluid flow to pass from piston cavity 820 to mixing chamber 790. Orifice 870 can be shaped to provide spray or flow distribution of fuel 120 into mixing chamber 790. A part of an inner surface of orifice 870 can be specifically configured to receive a portion of needle 720. through orifice 870.

Orifice 870 could be located at second end 810 most surface or located generally at second end region. Piston cavity 820 at second end 810 region can decrease in diameter, narrowing while extending toward second end 810 creating narrowing inner cavity 880. Narrowing inner cavity 880 can be configured to receive needle 720 and engage needle outer surface.

Needle 720 can allow passage of fuel 120 from second passage 740 to piston 710 narrowing inner cavity 880. Needle 720 can have a first end 890 located generally upstream and a second end 900 located generally downstream. Needle 720 can have a needle central cavity 910 located between first end 890 and second end 900 providing passage from first end 890 toward general region of second end 900. Needle 720 can extend from second body section 780 downstream generally parallel to longitudinal axis 860 to the general central region of mixing chamber 790.

Needle 720 first end 890 can receive fuel 120 from second passage 740 and allow flow into needle central cavity 910. Needle 720 can be configured to slideably insert into piston cavity 820 until reaching general region of narrowing inner cavity 880.

In other embodiments, needle 720 can be a separate structure which can be coupled to first body section 770 or body 700.

Upstream of second end 900, needle 720 can have an outlet passage 920 that allows passage of a fluid from needle central cavity 910 through the wall of needle 720 into piston cavity 820 and narrowing inner cavity 880. Part of needle 720 in a vicinity of second end 900 can taper down, thereby reducing the diameter of a cross-sectional area of needle 720. The downstream most end of needle 720 may include a point. The tapered section of needle 720 can be configured to engage with the surface of the narrowing inner cavity 880 and the orifice 870.

Figure 3B:
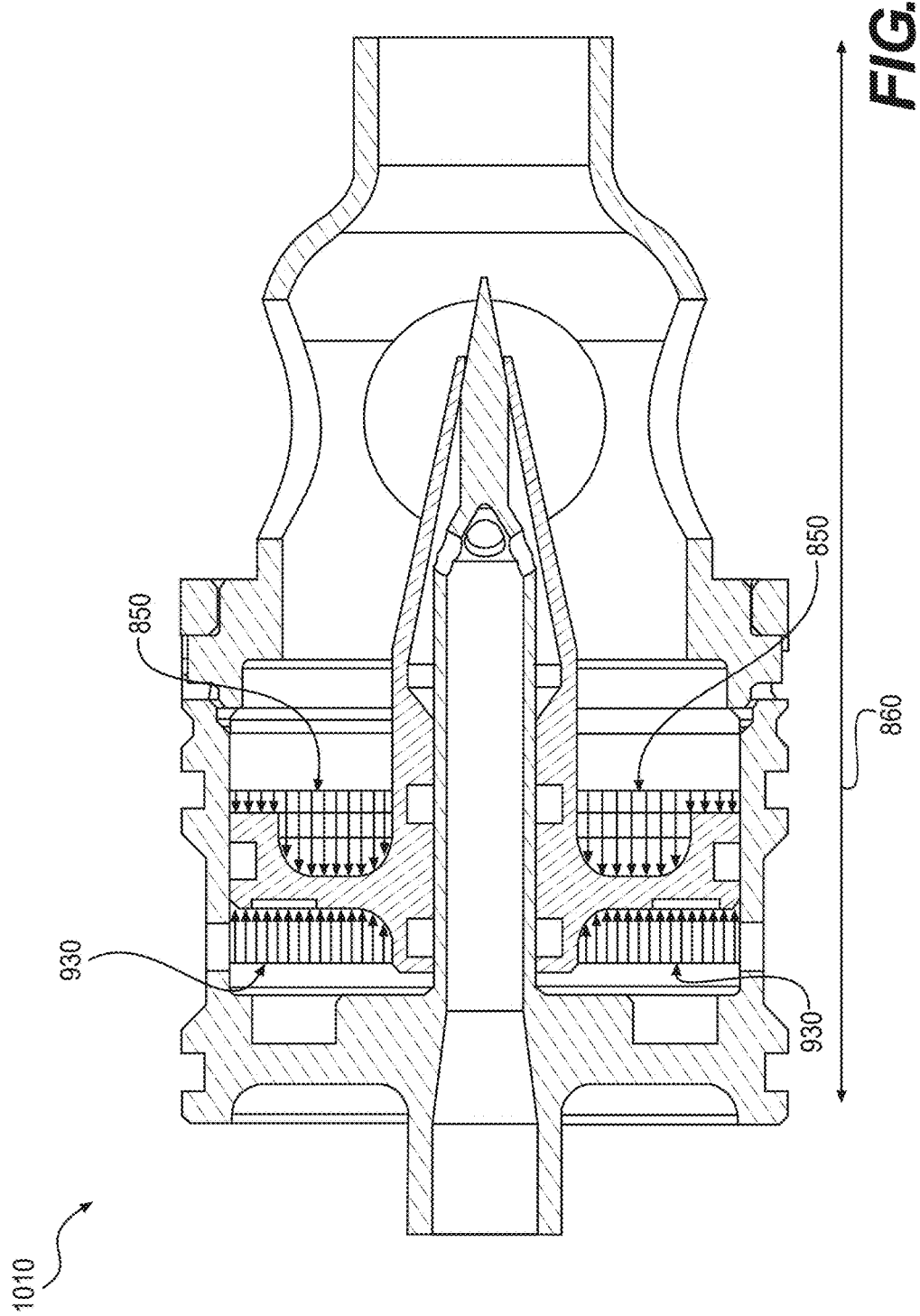
FIG. 3B is a cut-away cross-sectional view of an ejector, according to another exemplary embodiment.

Recirculation device 1010 can operate as follows. Force 850, as shown in FIG. 3B, can be applied to piston head surface 840. This may cause piston 710 to slide generally upstream. This direction may be generally parallel to longitudinal axis 860. Movement can cause second end 900 to protrude from narrowing inner cavity 880 through orifice 870 as piston 710 slides upstream. Piston 710 may slide upstream until second end 900 of needle 720 protrudes through orifice 870. This movement can fill orifice 870, preventing or limiting further sliding and blocking flow through orifice 870. Accordingly, the area of the opening between piston 710 narrowing inner cavity 880 and needle second end 900 can be changed. Modifying the opening area can control the flow rate of fuel 120 passing through orifice 870. Controlling the flow of fuel 120 through orifice 870 can control the flow of fuel 120 passing through second passage 740.

A spring (not shown) can be placed within internal cavity 760 and used to oppose force 850. For example, the spring could be configured to exert a spring force 930 against piston 830 in a downstream direction. This direction could be generally parallel to the longitudinal axis 860. The sum of force 850 and spring force 930 can determine the position of piston 850. The position of piston 850 can control the flow rate of fuel 120 through orifice 870 into mixing chamber 790. The spring can be selected to set an anode pressure at which, piston 850 is actuated.

In other embodiments, spring force 930 can be supplemented or replaced by a hydraulic force created by pressuring the internal cavity 760 upstream of piston 830.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A recirculation device, comprising:
    a body defining an internal cavity, the body comprising a first passage configured to receive an exhaust into the body, a second passage configured to receive a fuel into the body, a third passage configured to discharge a mixture of the exhaust and the fuel from the body, and a longitudinal axis extending from the second passage to the third passage;
    a piston slideably located within the body having a diaphragm seal fixed to an outer wall of the piston and an inner wall of the internal cavity, where the outer wall and diaphragm seal separate the internal cavity into a first cavity section that is exposed to the exhaust and a second cavity section separated from the exhaust, the piston comprises a piston cavity configured to receive a needle through the piston cavity, the piston cavity is configured to direct the fuel towards an orifice, the orifice is located at the smallest cross-sectional area of the piston cavity, whereby the piston is actuated along the longitudinal axis of the body toward the second passage by an exhaust force applied to the piston by the exhaust within the first cavity section of the body;
    a mixing chamber located within the body configured to receive the exhaust and configured to receive the fuel from the orifice; and
    the needle fixedly coupled to the body comprising:
        a first end that receives the fuel from the second passage and feeds the fuel into a central cavity that extends towards a second end; and
        in the general region of the second end an outlet passage discharges the fuel from the central cavity into the piston cavity;
    a spring positioned within the second cavity section of the body that contacts the piston and applies a spring force on the piston, wherein the spring force opposes the exhaust force;
    wherein the position of the piston is passively controlled by the exhaust force produced by a pressure of the exhaust within the body such that the sum of the exhaust force, the spring force, and a hydraulic force due to a pressure in the second cavity section determines the position of the piston and the flow rate of the fuel through the orifice into the mixing chamber.

2. A recirculation device according to claim 1, wherein the device is configured to operate within a fuel cell system.

3. A recirculation device according to claim 1, wherein the fuel ejected from the orifice and the exhaust is entrained and mixed within the mixing chamber.

4. A recirculation device according to claim 1, wherein the exhaust is discharged from the anode compartment of a fuel cell and fuel is a hydrogen containing fluid.

5. A recirculation device according to claim 1, wherein the exhaust inlet pressure supplied to the first passage of recirculation device ranges between about three to about 60 psig and the fuel pressure supplied to second passage of recirculation device ranges between about 30 to about 500 psig.

6. A recirculation device according to claim 1, wherein at least one of the fuel and the mixture flow velocity is configured to operate at supersonic speed.

7. A recirculation device according to claim 1, wherein as the needle enters the orifice, its area is reduced until the needle fills the orifice and seals off a flow of the fuel.

* * * * *